Patented July 2, 1946

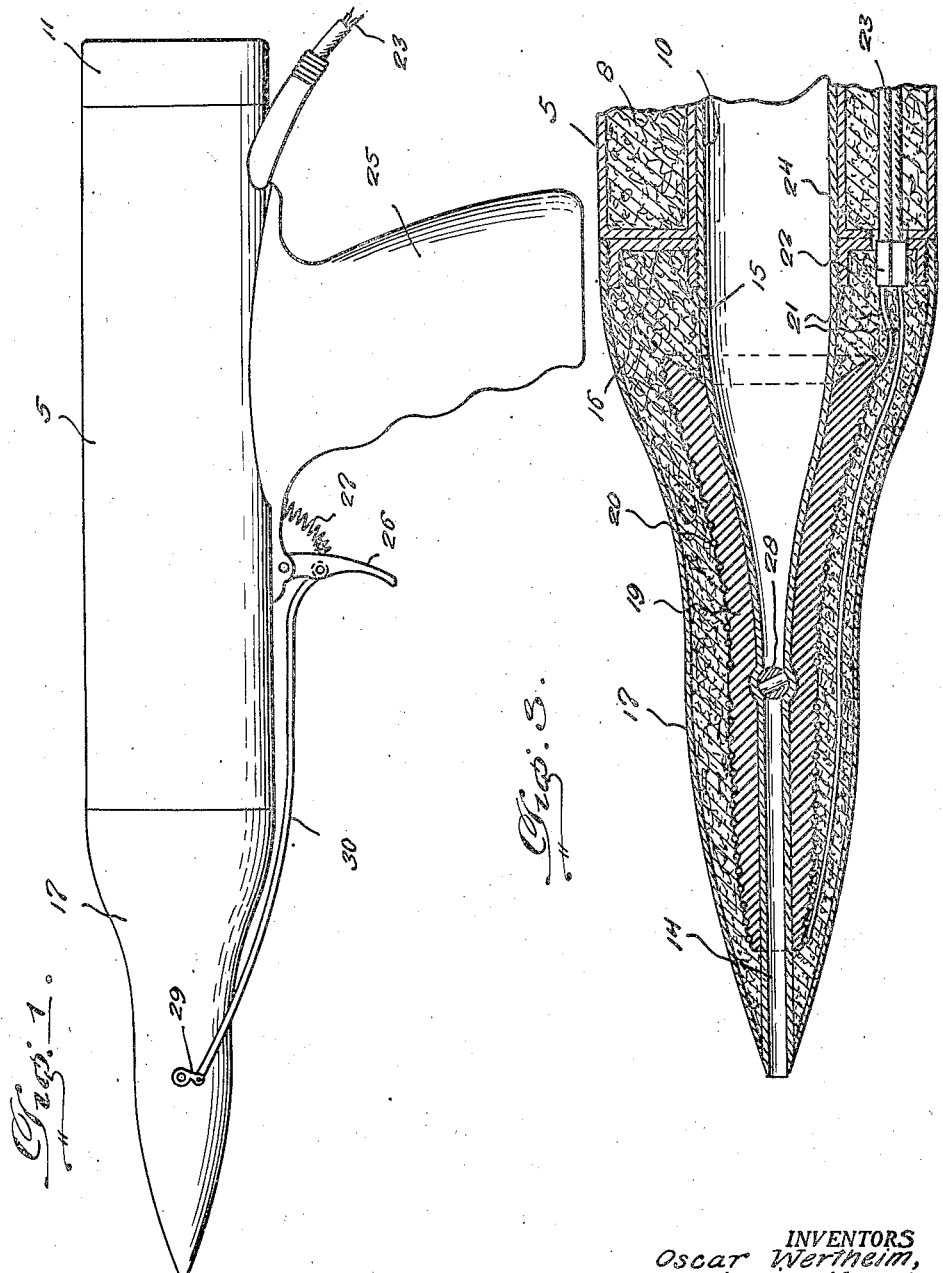

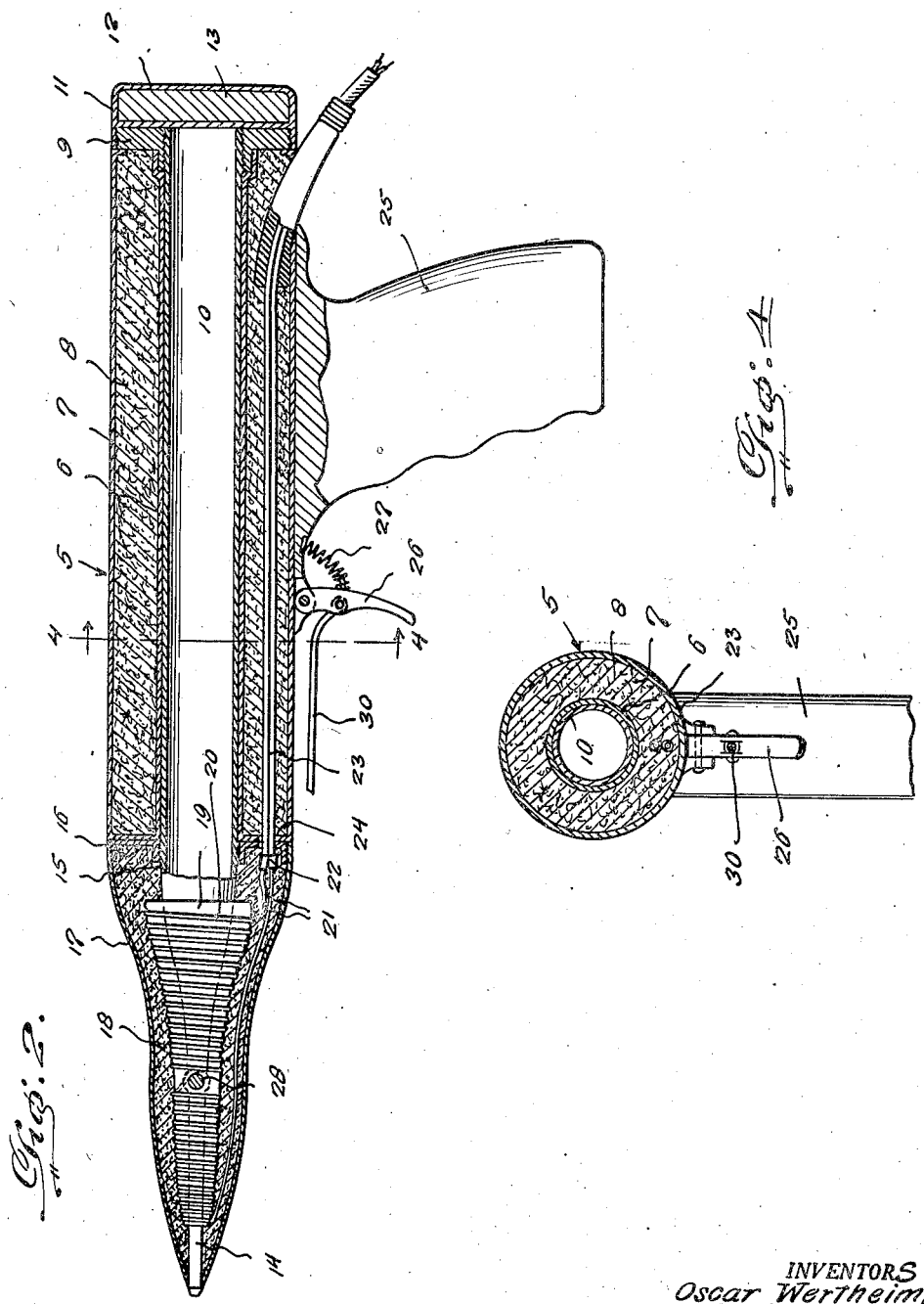

2,403,158

UNITED STATES PATENT OFFICE 2,403,158

ELECTRIC SOLDERING IRON

Oscar Wertheim and Louis Moses, Brooklyn, N. Y.

Application January 26, 1945, Serial No. 574,676

1 Claim. (Cl. 219—27)

The present invention relates to new and useful improvements in electric soldering irons adapted to receive a stick of solder, together with an electric heating element at the outer end of the soldering iron for melting the solder and delivering the same from the end of the iron onto the work.

An important object of the present invention is to provide an improved soldering iron having a tube therein for containing a stick of solder and which is electrically heated so that solder may be melted and to provide a valve-controlled device for the discharge of the melted solder onto the work.

A further object of the invention is to provide an electrically heated soldering iron of this character and in which the barrel of the iron is formed with a pistol grip for conveniently manipulating the iron and applying the solder to the work together with a trigger-actuated valve by means of which the feeding of the melted solder may be controlled.

A further object of the invention is to provide novel insulating means for the electric heating element to prevent heating of the barrel and the hand grip.

A still further object is to provide a device of this character of simple and practical construction, which is efficient and reliable in operation, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, and wherein like numerals refer to like parts throughout, and in which:

Figure 1 is a side elevational view.

Figure 2 is a longitudinal sectional view.

Figure 3 is an enlarged longitudinal sectional view of the tip of the iron, and

Figure 4 is a transverse sectional view taken substantially on a line 4—4 of Figure 2.

Referring now to the drawings in detail, wherein for the purpose of illustration we have disclosed a preferred embodiment of the invention, the numeral 5 designates a barrel generally which is composed of inner and outer spaced walls 6 and 7 providing a chamber between the walls adapted to be filled by rock wool or other insulation material.

The chamber between the inner and outer walls at the front end of the barrel are closed and the chamber at the inner end of the barrel is closed by a plug 9 threaded on the inner end of a tube 10 inserted longitudinally through the barrel, the tube being adapted to contain a stick of solder.

The plug 9 is externally threaded and adapted for threadedly receiving a cap 11 also having a chamber 12 formed therein and filled with rock wool or other insulation material 13.

The front or outer end of the tube 10 is tapered to form a reduced discharge passage 14 and the tube is externally threaded, as at 15, at the beginning of the tapering portion for threadedly receiving a plug 16 abutting the outer end of the barrel, as will be apparent from an inspection of Figure 2 of the drawings.

A hollow tapering tip 17 is threaded on the plug 16, the walls of the tip being spaced from the tapering end of the tube 10 to form a chamber adapted to also receive rock wool insulation or other material 18, the chamber being closed at its rear end by the plug 16.

The front end of the tip 17 is closed about the front end of the passage 14.

A sleeve 19 formed of highly compressed or compacted magnesium oxide powder surrounds the tapering front end of the tube 10, the sleeve having an electric heating coil 20 wound thereon. The electric wires 21 for the heating element are provided with connectors 22 for connecting with the electric wires 23 extending through openings 24 in the front end of the barrel 5, as well as in the plug 16, the wires 23 extending longitudinally through the barrel 5 and outwardly through a side wall thereof adjacent the rear end of the barrel for attaching to a suitable electric element.

The under side of the barrel 5 is formed with a pistol grip handle 25 to the front edge of which is pivotally attached a trigger 26 urged in a forwardly or released position by means of a coil spring 27.

A plug-type valve 28 is rotatably mounted in the passage 14 for controlling communication therethrough, one end of the valve extending outwardly through one side of the tip 17 and is provided with an operating lever 29 to which one end of a rod 30 is attached, the rod extending rearwardly of the barrel 5 for connection with the trigger 26.

The valve 28 is maintained in its closed position when the trigger 26 is held forwardly by the spring 27 and when the trigger 26 is moved rearwardly by the finger of an operator, the valve 28 is moved into its open position whereby to discharge the melted solder from the tube 10, into the passage 14 for depositing the solder onto the work.

By reason of the insulation material surrounding the tube 10 at its rear portion, as well as the insulation material positioned between the heating coil 20 and the tip 17, the barrel and tip are maintained in a relatively cool condition without danger to the workman handling the soldering iron.

In view of the foregoing description taken in conjunction with the accompanying drawings, it is believed that a clear understanding of the construction, operation and advantages of a tool of this character will be quite apparent to those skilled in the art. A more detailed description thereof is accordingly deemed unnecessary.

It is to be understood, however, that even though we have herein shown and described a preferred embodiment of our invention, the same is susceptible to certain changes fully comprehended by the spirit of the invention, as herein described, and the scope of the appended claim.

Having thus described the invention, what we claim is:

An electrically heated soldering iron comprising a barrel, a tube extending longitudinally of the barrel and adapted to contain solder to be melted, said tube having a threaded rear end and a threaded portion adjacent its front end, the front end of the tube forwardly of said last-named threaded portion tapering, a cap threaded on the rear end of the tube and engaging the rear end of the barrel, a tip threaded on the tapered front end of the tube abutting the front end of the barrel, a sleeve of compressed heat-conducting material enclosed in the tip and surrounding the tapered front end of the tube, an electric coil carried by the sleeve, insulation means between the sleeve and the tip, insulation means in the barrel, a valve in the front end of the tube, and operating means for the valve carried outwardly of the barrel.

OSCAR WERTHEIM.
LOUIS MOSES.